(No Model.)
A. R. PRITCHARD.
HANDLE FOR VESSELS.
No. 494,387. Patented Mar. 28, 1893.
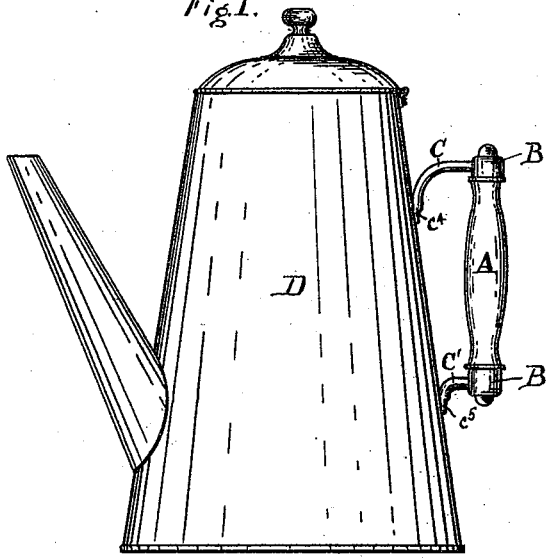
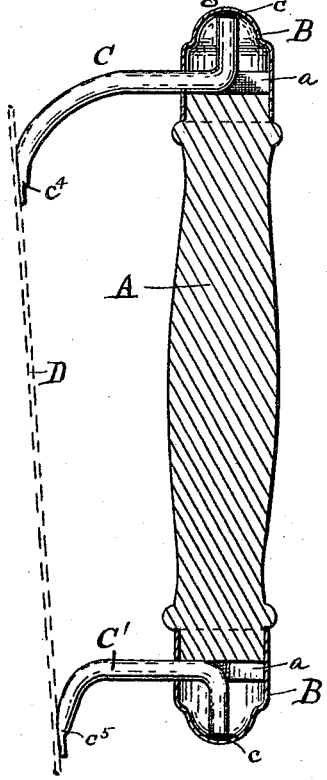
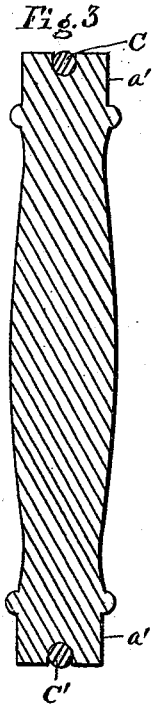
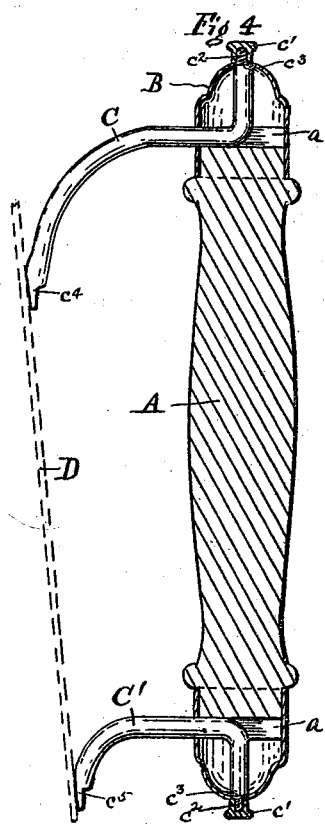
Witnesses,
H. E. Bates
S. P. Moon
Inventor,
Albert R. Pritchard
By Howard L. Osgood
Atty.
THE NORRIS PETERS CO., PHOTO-LITHO., WASHINGTON, D. C.

UNITED STATES PATENT OFFICE.

ALBERT R. PRITCHARD, OF ROCHESTER, NEW YORK, ASSIGNOR OF ONE-HALF TO CHARLES D. MILNE, OF SAME PLACE.

HANDLE FOR VESSELS.

SPECIFICATION forming part of Letters Patent No. 494,387, dated March 28, 1893.

Application filed February 11, 1893. Serial No. 461,989. (No model.)

*To all whom it may concern:*

Be it known that I, ALBERT R. PRITCHARD, a citizen of the United States, and a resident of the city of Rochester, in the county of Monroe and State of New York, have invented certain new and useful Improvements in Handles for Vessels, of which the following is a specification, reference being had to the accompanying drawings, in which—

Figure 1, is a side elevation of a coffee pot having one of my handles attached thereto. Fig. 2, is a longitudinal section of one of my handles. Fig. 3, is a longitudinal section of one of my handles in a plane transverse to the plane of the section of Fig. 2. Fig. 4, is a longitudinal sectional view of a modification.

The object of my invention is to provide a cold handle for metallic vessels of simple and cheap construction, and my invention consists in the arrangement of parts and devices hereinafter described and claimed.

In the drawings, A represents a non-conducting or wooden handle provided with a transverse slot $a$ across each end thereof and having a cylindrical portion $a'$ at each end to receive a cap or cylindrical ferrule B, having a closed end. A wire arm C or C' suitably bent passes through a perforation $b$ in the side of the cap B, and inside the cap is bent substantially at right angles so that the end of the wire rests against the extreme end of the cap, and is fastened thereto by soldering at the point $c$, as in Fig. 2, or, as in the modification shown in Fig. 4, a nut $c'$, fitting upon a screw $c^2$ cut on the end of the wire C or C', which passes through the end of the cap and then fastens the cap between the nut and a shoulder $c^3$ on the wire. The cylindrical portion of each cap is made of such diameter and length as to have a firm bearing on the cylindrical portion $a'$ of the handle when forced thereon. The perforation $b$ for the wire C or C' is made in such a position in the side of the cap that when the cap is forced into place upon the handle A, the wire C or C' rests in the slot $a$. The ends, $c^4$, $c^5$ of the wires C and C' are fastened to the vessel D by riveting or by soldering, as desired.

In the manufacture of metallic vessels such as tea pots and coffee pots it is customary to coat the handle with water proof enamel or japan before putting the parts thereof together and after the handle is fastened to the vessel the whole vessel is plated, as for instance, with nickel. It is important that in the plating bath there shall be no uncovered wooden surface of the handle, since the uncovered wood of the handle will absorb moisture and the handle will crack. In my device the handle A, including the inner surfaces of the slots $a$, is completely japanned or enameled, the caps provided with wires are forced upon the ends of the handles and the wires C C' are pressed into their seats, (the slots $a$) without cracking or breaking the japan or enamel, and there is no uncovered surface of wood which may be reached by moisture.

The handle A can not twist in the caps as the slots $a$ $a$, hold the wires C C'; the cylindrical portions of the caps B fit tightly and firmly upon the cylindrical portions $a'$ $a'$ of the handle; the cap is supported by the wire when being forced upon the handle and when the wires are fastened to the vessel the caps are firmly held on the handle.

What I claim is—

1. The combination of a metallic vessel, a non-conducting handle having transverse slots across the ends thereof, caps fastened on the ends of said handle, wires fastened to said vessel passing through the side of the caps, seated in said slots and fastened to said caps, substantially as described.

2. The combination of a metallic vessel, a non-conducting handle having transverse slots across the ends thereof, caps fastened on the ends of said handle, wires fastened to said vessel passing through perforations in the sides of said caps bent substantially at right angles inside said caps and fastened to the ends thereof and seated in said slots, substantially as described.

ALBERT R. PRITCHARD.

Witnesses:
S. P. MOORE,
A. N. BOWMAN.